United States Patent [19]
Levon

[11] Patent Number: 5,772,923
[45] Date of Patent: Jun. 30, 1998

[54] SOLUTION COMPRISING POLYANILINE AND AMPHIPHILIC SOLUBILIZER

[76] Inventor: Kalle M. J. Levon, 154 Bergen St., Apt. No. 1, Brooklyn, N.Y. 11217

[21] Appl. No.: 739,370

[22] Filed: Oct. 29, 1996

[51] Int. Cl.⁶ .............................. H01B 1/00; H01B 1/20; C08K 5/13
[52] U.S. Cl. ........................ 252/800; 524/323; 528/210; 528/216; 528/422
[58] Field of Search ........................... 252/500; 528/210, 528/216, 422; 524/323

[56]         References Cited

U.S. PATENT DOCUMENTS

| | | | |
|---|---|---|---|
| 5,232,631 | 8/1993 | Cao et al. ............................. | 252/500 |
| 5,403,913 | 4/1995 | MacDiarmid et al. ................. | 528/495 |
| 5,441,772 | 8/1995 | McAndrew et al. ................. | 427/388.1 |
| 5,470,505 | 11/1995 | Smith et al. ........................... | 252/500 |
| 5,494,609 | 2/1996 | Kulkarni et al. ..................... | 252/500 |
| 5,520,852 | 5/1996 | Ikkala et al. ........................ | 252/521 |
| 5,532,025 | 7/1996 | Kinlen et al. ........................ | 427/388.1 |
| 5,589,108 | 12/1996 | Shimizu et al. ...................... | 252/500 |
| 5,648,416 | 7/1997 | Miller et al. ......................... | 524/500 |

*Primary Examiner*—Douglas J. McGinty
*Assistant Examiner*—M. Kopec
*Attorney, Agent, or Firm*—Richard P. Fennelly; Louis A. Morris

[57]         ABSTRACT

A solution which comprises: a non-polar organic solvent, such as an aliphatic hydrocarbon solvent, like hexane; polyaniline; and an effective amount of an amphiphilic phenol-containing reagent, which can be a monomeric compound or a phenol-containing polymer, for the solubilization of the polyaniline in the solvent. The alkyl substituent in the phenol-containing reagent, if monomeric, can contain from about six to about twelve carbon atoms, with a preferred solubilizer being dodecylphenol.

10 Claims, 2 Drawing Sheets

SOLUTION COMPRISING POLYANILINE AND AMPHIPHILIC SOLUBILIZER

BACKGROUND OF THE INVENTION

The solubility of polyaniline in non-polar solvents is highly desired because of the enormous amount of available applications, for example, in the field of coatings. Polyaniline, in its emeraldine base form, is soluble in solvents like N-methyl pyrrolidone (NMP) and dimethyl sulfoxide (DMSO), but only in limited concentrations. The use of amphiphilic surfactant-like molecules, as dopants, like dodecylbenzene sulphonic acid (DBSA), is known to both protonate, thereby render conductive, and change the solubility so that these doped complexes are soluble in solvents like chloroform and hexane. Polyaniline, itself, has been modified in a variety of ways to achieve its solubilization in such solvents (including through N-alkylation at its amine site as described in Macromolecules 25 (1992) 3325 and following), but such modifications have been at the expense of the final electrical properties of the material. A method which increases the solubility of polyaniline in common solvents will be beneficial as more uses of this inexpensive electroactive polymer are discovered. The use of polyaniline in protective coatings for metals is one such use.

SUMMARY OF THE INVENTION

The present invention relates to the solubilization of polyaniline in its undoped state using an alkylphenol which is not acidic enough to cause doping but which is capable of solubilizing the polyaniline in organic non-polar solvents.

DESCRIPTION OF THE PREFERRED EMBODIMENTS

Figure 1A:
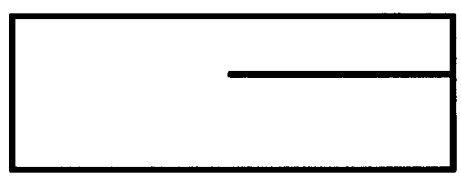
FIG. 1 illustrates the appearance of the salt fog-treated samples as further described in the Tables in the Examples.

The present invention contemplates the formation of a solution which comprises a non-polar organic solvent, polyaniline, and an effective amount of an amphiphilic phenol-containing reagent for the solubilization of the polyaniline in the solvent. The term "amphiphilic" as used herein is intended to indicate a reagent which has a dual hydrophobic and hydrophilic nature.

The non-polar solvent can, for example, be chosen from the halogenated and nonhalogenated aliphatic solvents with representative examples being chloroform, hexane, heptane, and the like. The amount of this solvent component can range from about 95% to about 99%, by weight of the entire solution. The use of compatible mixtures of more than one of the solvents is contemplated herein.

The polyaniline that is contemplated for dissolution in the forgoing type of solvent is well known in the art and includes both the substituted and unsubstituted forms of polyaniline as described at Col. 3, lines 27–52 of U.S. Pat. No. 5,470,505 of P. Smith et al. which is incorporated herein by reference. The polyaniline can be in any oxidation state: the fully reduced leucoemeraldine base, the "half" oxidized emeraldine base, the fully oxidized pernigraniline base, and the emeraldine salt (e.g., emeraldine hydrochloride). It is most preferred that the polyaniline be in the "half" oxidized emeraldine base form. The amount of this polyaniline component can range from about 0.05% to about 0.2%, by weight of the entire solution. The use of compatible mixtures of more than one of the previously described polyaniline materials is contemplated herein.

In order to achieve dissolution or solubilization of the aforementioned polyaniline in the selected solvent, the present invention contemplates the use of an effective solubilizing amount(from about 0.1% to about 5%, by weight of the entire solution) of an amphiphilic phenol-containing reagent. The amphiphilic phenol-containing reagent, if a monomeric compound, can contain one or more alkyl groups which can be the same or different and which will contain up to about twelve carbon atoms. The alkyl group or groups will preferably contain from about six to about twelve carbon atoms therein. A representative alkylphenol compound for use is dodecylphenol, such as p-dodecylphenol. The use of compatible mixtures of more than one of the previously described alkylphenols is contemplated herein.

Alternatively, polymers containing one or more phenols can be used as the amphiphilic phenol-containing reagent, and compatible mixtures of more than one of such phenol-containing polymers is contemplated herein.

The solution can also contain other additives which do not materially and adversely affect the solubility of the polyaniline in the chosen solvent, including surfactants, plasticizers, film-forming resins, pigments, and additional solvents.

The present invention is further illustrated by the Examples which follow.

EXAMPLE 1

This Example illustrates making a solution of polyaniline emeraldine base in p-dodecylphenol ("DDPh") in hexane.

Polyaniline emeraldine base ("PANI-EB", Neste Company) was combined with DDPh, from Aldrich Chemical Company, in a weight ratio of 1:4, and the mixture was stirred at 80° C. for two hours, forming a blue dispersion. After the solution was cooled to room temperature, a larger volume of hexane was added to the PANI/DDPh solution, and the mixture was stirred. The blue solution was filtered and was measured with uv/visible absorption spectroscopy. The appearance of an absorption at 640 nm was evidence of solution of the PANI-EB and was very similar to that of PANI-EB in NMP, as shown in the Figure, indicating that the acidic character of the phenol was not strong enough to induce any protonation but that the phenol appeared to be able to hydrogen bond with the PANI-EB and bring it into hexane solution.

EXAMPLE 2

This Example illustrates the preparation of steel test panels coated with PANI/DDPh/acrylic resin and demonstrates the utility of the composition tested.

The PANI/DDPh prepared as in Example 1 was dispersed in an air-curing acrylic resin and coated on unpretreated cold rolled steel (CRS) panels. The acrylic resin comprised ACRYLOID AU 608B brand acrylic resin, from Rohm & Haas Company, and a polyether-modified polydimethylsiloxane flow and leveling additive (BYK 300 brand from BYK-Chemie USA) in polypropylene glycol monomethyl ether acetate solvent, and the resin was cured with a polyisocyanate curing agent (DESMODUR N75BA brand from Bayer corporation)in polypropylene glycol monomethyl ether acetate solvent.

Cold rolled steel (CRS) panels were then coated with the acrylic composition which comprised various amounts of PANI/DDPh to dry film thickness of from about 1.8 to about 2.0 mils and were tested for corrosion performance in a salt spray (fog) chamber. Samples were evaluated according to test methods ASTM B117, ASTM D714, ASTM D610, and ASTM D1654. Information about the methods and performance test results after 100 and 200 hours testing are summarized in Tables I, II, and III which follow. The data indicate that increased amounts of PANI/DDPh in acrylic resin resulted in decreased relative areas of failure, decreased distances of scribe failure, and higher overall ASTM ratings.

Table I gives a description of the test methods that were employed and the terminology that is used in Tables II and III.

TABLE I

I. Test Methods

| Test | Method |
|---|---|
| Salt Spray Resistance | ASTM B117 |
| Blister Evaluation | ASTM D714 |
| Rust Evaluation | ASTM D610 |
| Corrosion Evaluation | ASTM D1654 |

TABLE I-continued

Overall Area-Procedure B

II. Blistering Evaluation

| Size | | Frequency | |
|---|---|---|---|
| 10 | no blisters | cl | Cluster |
| 8 | 1/64~1/32 in. | F | Few |
| 6 | 1/16~⅛ in. | M | Medium |
| 4 | 3/16~¼ in. | MD | Medium Dense |
| 2 | ⅜~½ in. | D | Dense |
| 0 | >⅝ in. | | |

III. Rusting Evaluation

| Rust Grade | Description |
|---|---|
| 10 | No rusting or less than 0.01% of surface rusted. |
| 8 | Few isolated spots, less than 0.1% of surface. |
| 4 | Rusting to the extent of 10% of surface rusted. |
| 0 | Approximately 100% of surface rusted. |

IV. Corrosion Evaluation

| Area of Failure(%) | ASTM Rating Number |
|---|---|
| No Failure | 10 |
| 2~3 | 8 |
| 7~10 | 6 |
| 41~55 | 2 |
| >75 | 0 |

Table II, which follows, gives the summarized results of one hundred hours salt-fog testing of various samples.

Figure 1B:
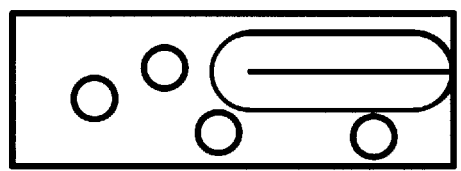
Figure 1C:
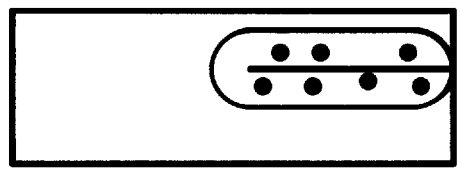
Figure 2:
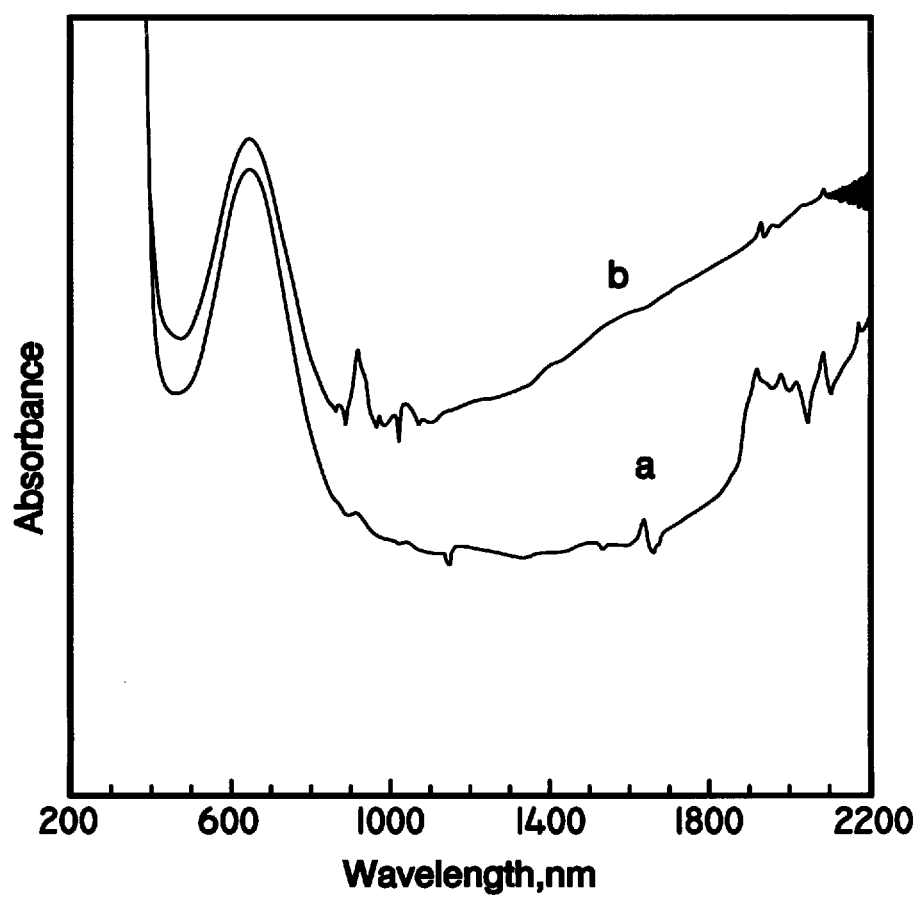
FIG. 2 illustrates the UV-Vis spectra of the emeraldine base form of polyaniline in N-methylpyrrolidone (see spectra "a") and that of the emeraldine base form of polyaniline and dodecylphenol in hexane (see spectra "b").

|  |  | Air-Curing Formula | 0.3% wt P/DBSA | 1% wt P/DBSA | 0.1% wt P/DDPh | 0.3% wt P/DDPh | 1% wt PDDPh | 5% wt P/DDPh | 10% wt P/DDPh |
|---|---|---|---|---|---|---|---|---|---|
| Film Appearance | | | | | | | | | |
| Color | | Clear | Clear | Clear | Clear | Clear | Clear | Clear | Clear | Clear |
| Integrity | | Exc. | Exc. | Exc. | Exc. | Exc. | Exc. | Exc. | Exc. | Exc. |
| Salt-Fog Resistance | | | | | | | | | |
| Blistering | ASTM | 8cl | 8F/8cl | 8F | 8F | 8F | 8F | 8F | 10/8F |
| Rusting | ASTM | 9.5 | 10 | 10 | 10 | 10 | 10 | 10 | 10 |
| Corrosion Overall Area Method B | | | | | | | | | |
| Fail. Area: | Percent | 14 | 12 | 6 | 15 | 15 | 9 | 6 | 3 |
| ASTM Scribed Area | Rating | 5.5 | 5.5 | 6 | 5 | 5 | 6 | 7 | 8.5 |
| General App | | Good | Fair | Poor | Good | Good | Good | Exc. | Exc. |
| Distance from scribe | mm | 9 | 11 | 12.5 | 9 | 8.8 | 8.8 | 6 | 4 |
| Blistering | ASTM | 8M | 8F/8M | 6M | 8M | 8MD | 8F/8M | 10 | 10 |
| Appearance | FIG. 1 | B | A | A | B | B | B | C | C |

Table III, which follows, gives the summarized results of two hundred hours salt-fog testing of various samples.

|  | Air-Curing Formula | 0.3% wt P/DBSA | 1% wt P/DBSA | 0.1% wt P/DDPh | 0.3% wt P/DDPh | 1% wt PDDPh | 5% wt P/DDPh | 10% wt P/DDPh |
|---|---|---|---|---|---|---|---|---|
| Film Appearance | | | | | | | | |
| Color | Clear | Clear | Clear | Clear | Clear | Clear | Clear | Clear | Clear |

-continued

|  |  | Air-Curing Formula | 0.3% wt P/DBSA | 1% wt P/DBSA | 0.1% wt P/DDPh | 0.3% wt P/DDPh | 1% wt PDDPh | 5% wt P/DDPh | 10% wt P/DDPh |
|---|---|---|---|---|---|---|---|---|---|
| Integrity Salt-Fog Resistance | Exc. | Exc. | lt. green Exc. | Exc. | Exc. | Exc. | Exc. | Exc. | Exc. |
| Blistering | ASTM | 8cl | 8F/8cl | 8F | 8F | 8F | 8F | 8F | 8F |
| Rusting Corrosion Overall Area Method B | ASTM | 9.5 | 10 | 10 | 10 | 10 | 10 | 10 | 10 |
| Fail. Area: ASTM Scribed Area | Percent Rating | 18 4.5 | 23 4.5 | 30 4 | 20 4.5 | 13 5 | 15 5 | 13 5 | 5 8.5 |
| General App |  |  | Good | Fair | Poor | Good | Good | Good | Fair | Fair |
| Distance from scribe | mm | 15 | 15 | 17 | 13 | 14 | 15 | 9 | 6 |
| Blistering Appearance | ASTM FIG. 1 | 8M B | 8F/8M A | 6M A | 8MD B | 8MD B | 8MD B | 8D C | 8D C |

The foregoing Examples, since they are presented for illustrative purposes only, should not be construed in a limiting sense. The scope of protection sought is set forth in the claims which follow.

I claim:

1. A solution which comprises a non-polar organic solvent, polyaniline, and an effective amount of an amphiphilic non-polymeric phenol-containing reagent for the solubilization of the polyaniline in the solvent, wherein said non-polar organic solvent is different from said amphiphilic non-polymeric phenol-containing reagent.

2. A solution as claimed in claim 1 wherein the organic solvent is an aliphatic hydrocarbon solvent.

3. A solution as claimed in claim 1 wherein the organic solvent is hexane.

4. A solution as claimed in claim 1 wherein the amphiphilic phenol-containing reagent is an alkylphenol compound having an alkyl substituent containing from about six to about twelve carbon atoms.

5. A solution as claimed in claim 1 wherein the organic solvent is hexane and wherein the amphiphilic phenol-containing reagent is an alkylphenol compound having an alkyl substituent containing from about six to about twelve carbon atoms.

6. A solution as claimed in claim 4 wherein the alkyl substituent in the alkylphenol is dodecylphenol.

7. A solution as claimed in claim 4 wherein the alkyl substituent in the alkylphenol is p-dodecylphenol.

8. A solution as claimed in claim 2 wherein the organic solvent is hexane and wherein the amphiphilic phenol-containing reagent is an alkylphenol compound having an alkyl substituent containing from about six to about twelve carbon atoms.

9. A solution as claimed in claim 1 wherein the organic solvent is hexane and wherein the amphiphilic phenol-containing reagent is dodecylphenol.

10. A solution as claimed in claim 1 wherein the organic solvent is hexane and wherein the amphiphilic phenol-containing reagent is p-dodecylphenol.

* * * * *